Oct. 26, 1965 M. C. ORR 3,213,672
RADIATOR TEST APPARATUS
Filed Dec. 9, 1963 2 Sheets-Sheet 1

INVENTOR.
MYRON C. ORR
BY
Wells & St. John
ATTYS.

Oct. 26, 1965    M. C. ORR    3,213,672
RADIATOR TEST APPARATUS
Filed Dec. 9, 1963    2 Sheets-Sheet 2
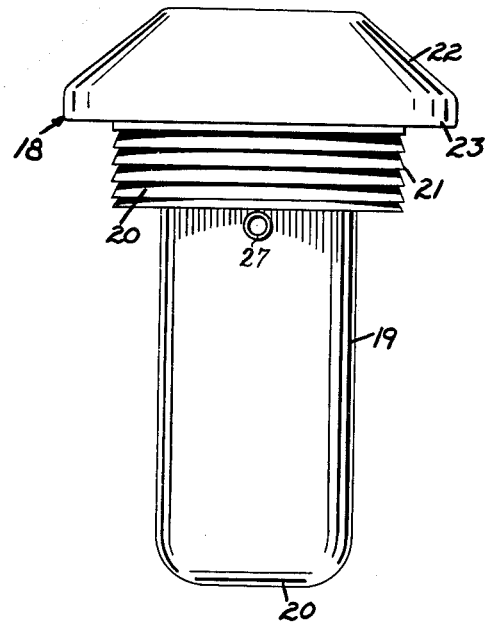
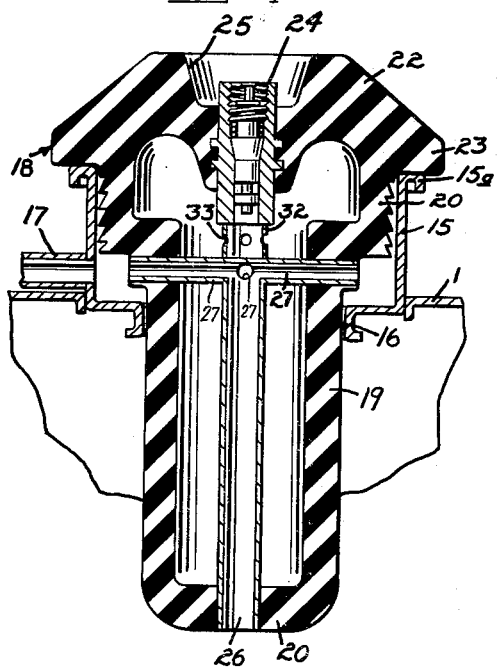
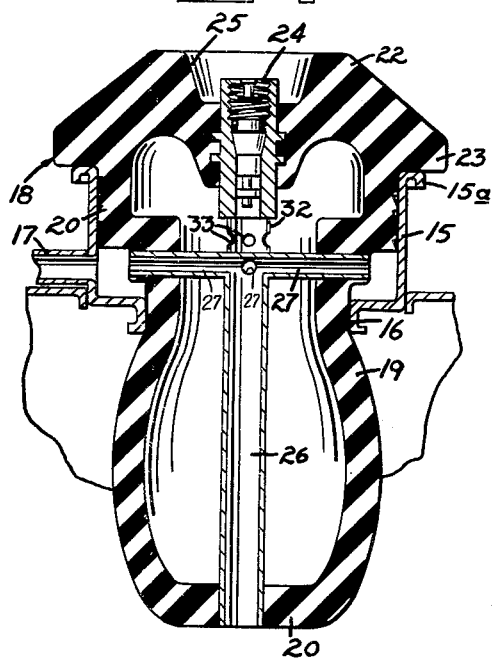
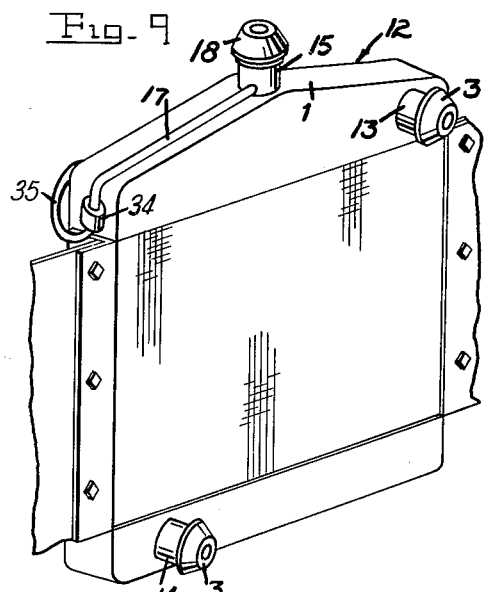
INVENTOR.
MYRON C. ORR
BY Wells & St. John
ATTYS.

3,213,672
RADIATOR TEST APPARATUS
Myron C. Orr, 2007 Ellis Ave., Missoula, Mont.
Filed Dec. 9, 1963, Ser. No. 329,003
4 Claims. (Cl. 73—45.8)

This invention relates to a novel apparatus for testing radiators such as those used on internal combustion engines, so as to determine the location or existence of leaks in the radiator core.

It is desirable to test radiators and radiator systems so as to determine the existence of holes or leaks in the radiator itself, and so as to locate the positions of such leaks in order that they might be repaired. This is accomplished according to the present invention by simple plugs used to seal the radiator and to allow one to pressurize the interior of the radiator so that under higher interior pressures than atmospheric pressure one can find leaks in the radiator by observance. The devices described can be used to test a radiator while in a vehicle, or after it has been removed for repair purposes. There are provided two basic types of plugs to seal the radiator, one being adapted to completely seal off the various hose connection sleeves, and the other being adapted to seal the radiator inlet or filler neck, while allowing the overflow tube opening to the filler neck to be utilized to direct compressed air to the interior of the radiator.

It is a first object of this invention to provide a novel apparatus that can be utilized in conventional radiator assemblies to completely seal the radiator core from the external connections formed therein, so that the interior of the radiator core can be subjected to air at a pressure greater than atmospheric in order that leaks in the core can be detected by observance of the core.

Another object of this invention is to provide simple molded plugs for the various openings of the radiator, the plugs being designed to withstand high interior and exterior pressures and being adapted to remain in place during the testing of the radiator core using high pressure air.

Another object of this invention is to provide an arrangement by which the overflow tube of the radiator can be used for the introduction of air to the interior of the radiator after all outlets and inlets have been sealed, thereby simplifying the plug used to seal the filler inlet, and eliminating the necessity of a separate air inlet to the interior of the radiator.

These and other objects will be evident from a study of the following disclosure, and the accompanying drawings which illustrate a preferred form of the invention. It is to be understood that this form is merely exemplary, and that it is not intended to limit or restrict the scope of the invention, since the invention itself is set out in the claims that follow the detailed disclosure.

In the drawings:

FIGURE 6 is a view similar to FIGURE 1, showing a second form of the invention used to seal the filler neck of a radiator core;

FIGURE 7 is a view similar to FIGURE 2, showing the second form of plug in place within a filler neck of a radiator prior to the introduction of pressurized air to either the radiator or plug;

FIGURE 8 is a view similar to FIGURE 7, showing the plug in its expanded condition; and FIGURE 9 is a perspective view of a typical radiator showing three plugs in place to seal the inlet and outlet connections to the radiator core and also the filler neck at the top of the radiator.

Figure 1:
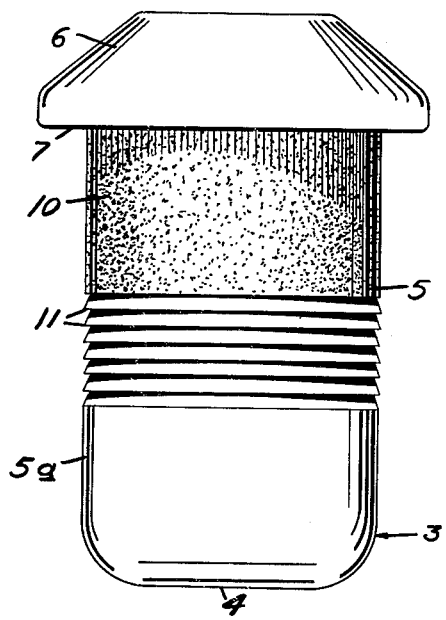
FIGURE 1 is a side elevation view of a first form of plug used to seal the hose sleeve connections to the radiator core.

Referring now to the drawings, a first form of my novel plug is illustrated in FIGURES 1 through 5. This form of the plug is designed to completely seal an opening to the radiator, such as the inlet or outlet for the main supply of cooling water of an internal combustion engine, oil cooler or heater. It is to be understood that the plug shown in the drawings must be supplied in several different sizes so as to accommodate itself to the various sizes of inlets and outlets found on conventional internal combustion engine radiators.

Figure 2:
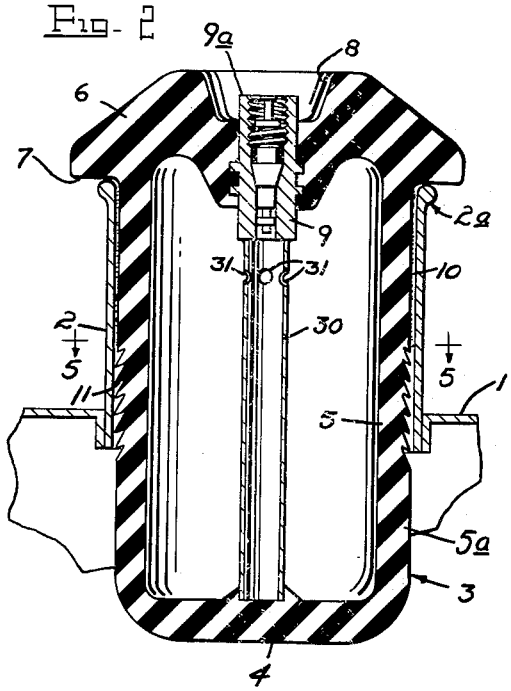
FIGURE 2 is an axial sectional view cut longitudinally through the deflated plug shown in FIGURE 1, the plug being illustrated in place within a hose sleeve connection.
Figure 4:
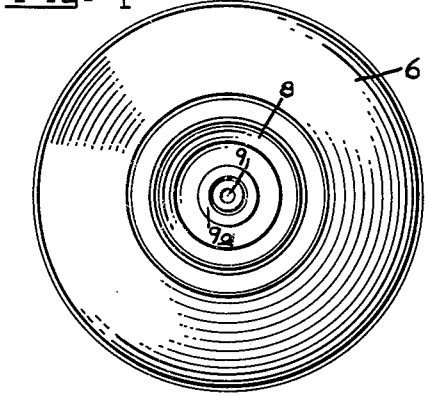
FIGURE 4 is a top view of the plug seen in FIGURE 1.
Figure 3:
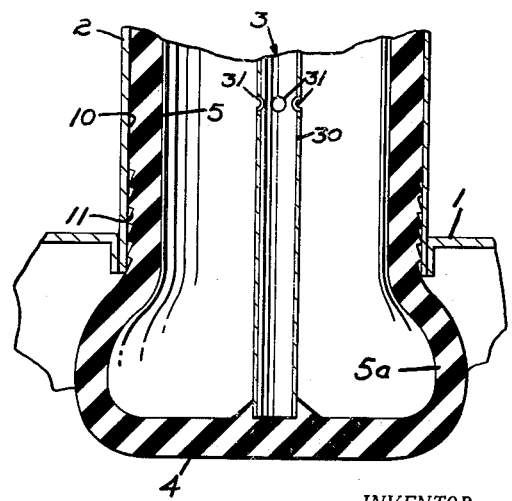
FIGURE 3 is a fragmentary view of the lower portion of the plug seen in FIGURE 2, the plug being illustrated in its inflated condition.
Figure 5:
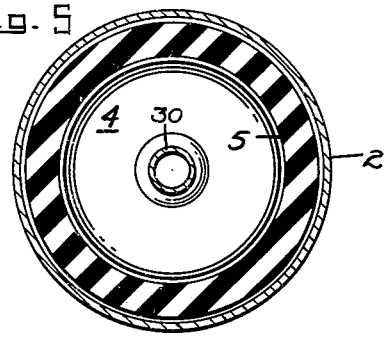
FIGURE 5 is a sectional view cut along line 5—5 in FIGURE 2.

The first form of the plug is shown in FIGURES 2 and 3 as it would be utilized on a conventional radiator assembly. The numeral 1 indicates the tank of the radiator for an internal combustion engine. The numeral 2 indicates a sleeve which is provided about an opening to the interior of the radiator core. As shown, this might be one of the hose connections to either the block of the engine or to the water pump. It is to be understood that the opening might also be a water inlet or outlet connecting the radiator system to a heater within the vehicle or any other opening to the radiator core.

The invention comprises a test plug that completely closes such an opening during pressure testing of the radiator. The plug comprises a hollow resilient body 3 shaped for ready insertion in the sleeve 2. The body 3, in its normal configuration, has a cylindrical shape, with an exterior diameter slightly less than the diameter of the sleeve 2 within which it is to be fitted. Suitable material for the body 3 is natural or synthetic rubber having a thickness capable of withstanding the pressures involved in its use. The entire body 3 of the plug should be integrally formed of resilient material in order to provide the maximum safety in the use of the plug.

The body 3 has a relatively thick bottom wall 4, and integrally molded cylindrical walls 5 having a depth somewhat greater than the depth of the sleeve 2. The body 3 has a cap 6 that is provided with an outwardly protruding flange 7 adapted to rest upon the outer edge 2a of the sleeve 2. The cap 6 of the body 3 is substantially thicker than the remainder of body 3, so that it is capable of retaining its basic shape wthout deformation.

Cap 6 is recessed at its center (designated by the numeral 8) about a conventional air valve 9, similar to that type of valve used in automobile tires. The top 9a of the valve 9 is located below the upper extremity of the recess 8 so that the plug presents a yieldable exterior surface all about the valve 9 to prevent injury to persons in the event the plug is blown out of an opening during use.

Rigidly secured to the lower end of valve 9 and to the bottom wall 4 is a metal tube 30. This tube 30 is provided with a series of apertures 31 to permit free passage of air from valve 9 to the interior of plug 3. The tube 30 serves to prevent longitudinal expansion of plug 3 under pressure, and helps to prevent creep of plug 3 toward the radiator exterior.

To seal the opening such as that within the sleeve 2, the plug 3 is positioned within the opening, as shown in FIGURE 2, and then is inflated through valve 9 from a suitable conventional source of compressed air. This inflating operation is similar to the manner by which an automobile tire is inflated. FIGURE 3 shows the shape of the lower portion of the plug 3 after it has been inflated. The cylindrical walls 5 expand to contact the sleeve 2 along its entire length, and sufficient air pressure is utilized so as to expand the lower protruding section 5a of the walls 5 outwardly beyond the radius of the sleeve 2, and to radially stretch the bottom wall 4. This expanded portion of the plug 3 serves as a physical barrier to resist outward movement of the plug 3 relative to the sleeve 2.

In order to enhance the grip of the body 3 against the sleeve 2 and to prevent slip and creep of the cylindrical walls 5 relative to sleeve 2 when high air pressure is applied inside the radiator, the exterior of the cylindrical portion 5 has a band 10 of abrasive material on its exterior surface. This can be seen in FIGURE 1. The band is made by imbedding particles of abrasive material such as garnet, silica, or hardened metal particles in the outer surface of the walls 5 or otherwise adhering the particles to this surface. In addition, the walls 5 are provided with a series of annular ribs 11 arranged to expand against the sleeve 2 and oppose the escape of air between the walls 5 and sleeve 2. Air that attempts to move up between the walls 5 and sleeve 2 will press these ribs 11 outwardly against the sleeve 2 with increased force as the pressure increases.

The plug described above and shown in FIGURES 1 through 5 is used to completely seal any inlet or outlet to the radiator a typical radiator being shown in FIGURE 9 and designated by the numeral 12. The radiator inlet 13 and a lower outlet 14 are shown in this example, each being fitted with a plug 3 as previously described. A conventional radiator normally will have additional inlets or outlets for an oil cooler or external heater. It is to be understood that smaller or larger plugs 3 will be provided for each of these openings, as might be necessary in order to seal the radiator for pressure testing.

A slightly modified form of the plug is utilized in the filler neck 15 which is normally found at the top of the radiator 12 and sealed within the basic shell 1. The neck 15 is generally cylindrical in shape, and normally has a restricted opening 16 leading to the interior of the radiator shell 1. There usually is also provided a small overflow tube 17 opening radially to the neck 15 directly above the opening 16 and adapted to carry off excess water from within the interior of the radiator shell 1.

The modified plug 18 shown in FIGURES 6 to 8 comprises a basically cylindrical body having side walls 19 and a lower wall 20. The exterior diameter of the side walls 19 is slightly less than the interior diameter of the restricted opening 16 of the radiator. The entire plug 18 is preferably molded in one piece of natural or synthetic rubber or other suitable resilient material. The main body of the plug 18 also includes an enlarged cylindrical section 20 provided with ribs 21 similar to the ribs 11 described with reference to the first form of the plug. The cylindrical section 20 has an exterior diameter slightly less than the interior diameter of the filler neck 15 and is adapted to be placed therein as can be seen in FIGURE 7. The plug is completed by an upper portion 22 substantially similar to that previously described and including outwardly directed flanges 23 adapted to abut the outer end 15a of the filler neck 15. Again there is provided a recessed valve 24 fitted within a well 25 so that the valve 24 does not protrude beyond the rubber surfaces of the plug 18.

Mounted within the interior of the plug 18 is a longitudinal tube 26, which is preferably made of brass or other suitable metal, and which is sealed within the bottom wall 20 of the plug 18. The tube 26 opens to a plurality of radially extending tubes 27 that extend through the cylindrical walls 19 of plug 18 directly adjacent to the enlarged cylindrical portion 20, so that the tubes 27 will protrude through the cylindrical body of plug 18 at a location above the restricted opening 16 of filler neck 15, but below the ribs 21 that seal the walls of the filler neck 15 from the exterior atmosphere. Thus the tube 26 is placed in open communication with the overflow tube 17 of filler neck 15. The sealed combination of tubes 26 and 27 are open to the plug exterior at a first location at the closed lower end of plug 18 and at a second radial location adjacent to the flanges 23.

In this embodiment of the device a short tube 32 is fixed between the lower end of valve 24 and the top surface of tubes 27. Tube 32, provided with open apertures 33, serves to prevent longitudinal expansion of plug 18 so as to better eliminate the danger of plug 18 creeping from the opening which it is designed to seal. It is to be understood that the lower end of tube 32 is not in communication with the interior of tubes 27 and 26, and that tubes 27 and 26 do not open to the interior of plug 18.

In utilizing this apparatus, the radiator inlets and outlets such as 13 and 14 shown in FIGURE 9 are first sealed by insertion of plugs 3 and inflation of the plugs 3 by means of the valves 9. After all of the inlets and outlets have been sealed, the filler neck 15 is fitted with a modified plug 18, which also is inflated through valve 24 so that the plug 18 attains the expanded shape shown in FIGURE 8. In this condition, the ribs 21 of plug 18 are expanded against the interior walls of the filler neck 15, and again are shaped so that escaping air tends to compress the ribs 21 even more tightly against the wall of the neck 15. The restricted opening 16 is also directly sealed by contact with the cylindrical walls 19 of the plug 18, and the lower protruding portions of the walls 19 are expanded radially so that they cannot slip through the restricted inlet 16. Thus all of the inlets and outlets of the radiator are tightly sealed by plugs under internal pressure sufficient to withstand the testing pressure desired within the radiator.

Air or gas can be introduced to the interior of radiator 12 by connecting the open end of the overflow tube 17 to a suitable fitting 34 connected by means of a hose 35 to a compressor, tank, or other conventional source of compressed air. The radiator 12 can then be tested for leaks under pressure, and the location of the leaks can be found by observance of escaping air either in the atmosphere or in a liquid bath.

After testing has been completed, the pressure within the radiator 12 is returned to normal and allowed to escape through the overflow tube 17. The various plugs can then be deflated by releasing the valves 9 and 24, after which the plugs will return to their original shapes so that they can be easily removed from the various inlets and outlets of the radiator.

The present invention provides simple molded plugs that are made entirely of resilient material, so that accidental release of a plug during testing will normally cause little injury to persons in the vicinity. Despite all precautions, such accidental release is always possible due to the high pressures involved in such testing, and the resiliency of the plugs themselves. The plugs require no mechanical adjustment, and are simply pneumatically inflated for use. The time involved in testing a radiator is greatly decreased when using the plugs according to this invention. It is understood that various modifications might be made in the structure of the plugs without deviating from the basic concept of the invention. It is also to be understood that the plugs can also be adapted to other devices than radiators, being usable for pressure testing or closing any vessel with restricted opening. Likewise, the particular forms of valves illustrated in the drawings is not to be a limiting factor in the understanding of this invention, since any conventional or suitable valve capable of operating as described can be substituted in place of the tire type valve illustrated.

Having thus described my invention, I claim:
1. A test apparatus comprising:
   a first plug adapted to seal inlets or outlets leading to the interior of a hollow vessel and provided with a cylindrical sleeve in communication therewith, said plug having an integral molded resilient structure including a hollow sealed cylindrical body of length greater than that of said sleeve and a relatively thick cap housing an external valve in communication with the interior of said body;

and a second plug adapted to seal an inlet filler neck having an intermediate overflow tube leading therefrom intermediate the outer end of the filler neck and a restricted inner opening leading to the interior of said vessel, said plug having an integral molded resilient structure including a hollow sealed cylindrical body of a length greater than said neck and a relatively thick cap housing an external valve in communication with the interior of said body, and further comprising;

tube means sealed within the walls of said body of said second plug and extending through the interior thereof in open communication with the plug exterior of the closed end of said cylindrical body and at a second location on said body located from said cap a distance less than the separation between the outer end of said filler neck and said restricted opening.

2. A test apparatus for pressure testing of radiator cores by utilizing compressed air entering the radiator through the overflow tube, comprising:

a first set of plugs for sealing the sleeves to which inlet and outlet hoses for the core are normally connected, each plug comprising a hollow sealed resilient cylindrical body of a length greater than that of the sleeve to receive it and a diameter slightly less than the inner sleeve diameter, each plug further having a valve connected to the exterior thereof and communicating to the interior thereof whereby the plug can be selectively inflated;

a modified plug adapted to seal an inlet filler neck, said modified plug having a cylindrical body section at its outer end of enlarged exterior diameter relative to the exterior diameter of the remainder of its body;

and tube means in said modified plug sealed relative to the walls thereof and open to the exterior at the end of said body opposite to said body section of enlarged exterior diameter and at a second location intermediate said section and the inlet opening of the radiator.

3. A test apparatus comprising:

a molded resilient plug having a hollow cylindrical body closed at one end and provided with a radially extended cap at its remaining end;

valve means mounted within said cap in communication therethrough;

and tube means sealed within the walls of said body and extending continuously through the interior thereof in open communication with the exterior of the plug at a first location on said one end of said body and at a second location radially situated on said body at a position adjacent to said cap.

4. A test apparatus comprising:

a molded resilient plug having a hollow cylindrical body closed at one end and provided with a radially extended cap at its remaining end;

valve means mounted within said cap in communication therethrough with the interior of said body;

and tube means sealed within the walls of said body and extending continuously through the interior thereof in open communication with the exterior of the plug at a first location on said one end of said body and at a second location radially situated on said body at a position adjacent to said cap;

rigid means joining the longitudinal axial ends of said body at the interior thereof to prevent longitudinal expansion of said body.

References Cited by the Examiner
UNITED STATES PATENTS

| | | | |
|---|---|---|---|
| 1,506,418 | 8/24 | Evensta | 138—90 |
| 2,219,190 | 10/40 | McCoy | 137—223 |
| 2,273,984 | 2/42 | Osborn | 33—190 |
| 2,309,429 | 1/43 | Ahern | 138—93 |
| 2,679,092 | 5/54 | Austin | 73—45.8 |
| 2,886,203 | 5/59 | Goll | 217—110 |
| 3,091,259 | 5/63 | Alessio | 138—90 |
| 3,129,726 | 4/64 | Moore | 138—93 |

ISAAC LISANN, *Primary Examiner.*